(Model.)

3 Sheets—Sheet 1.

J. DECOMBE.
Door Hinges.

No. 235,417.

Patented Dec. 14, 1880.

(Model.) 3 Sheets—Sheet 2.

J. DECOMBE.
Door Hinges.

No. 235,417. Patented Dec. 14, 1880.

Witnesses
H. F. Dexter
Frank A. Brooke

Inventor
Joseph Decombe
By Dewey & Co. Att'ys (Model.)

3 Sheets—Sheet 3.

J. DECOMBE.
Door Hinges.

No. 235,417.

Patented Dec. 14, 1880.

Witnesses
Frank A. Brooks
H. F. Dexter

Inventor
Joseph Decombe
By Dewey & Co,
Attys

UNITED STATES PATENT OFFICE.

JOSEPH DECOMBE, OF SAN FRANCISCO, CALIFORNIA.

DOOR-HINGE.

SPECIFICATION forming part of Letters Patent No. 235,417, dated December 14, 1880.

Application filed September 30, 1880. (Model.)

*To all whom it may concern:*

Be it known that I, JOSEPH DECOMBE, of the city and county of San Francisco, State of California, have invented Improved Hinges for Double Doors; and I hereby declare the following to be a full, clear, and exact description thereof.

My invention relates to certain improvements in hinges for double doors, and it is more especially applicable to doors constructed and hung as shown in my patent of October 28, 1879; and it consists in means for securing the hinges to the posts so that may be held rigidly in place, but may be easily removed when desired.

My invention further consists in the employment of plates which serve to fill the spaces between the hinges, and of sleeves which extend between the hinges, so that when the doors are closed the joint presents an unbroken bead from top to bottom. If desired, the sleeves may be formed without the intervening plates, as will be more fully explained by reference to the accompanying drawings, in which—

Figure 1:
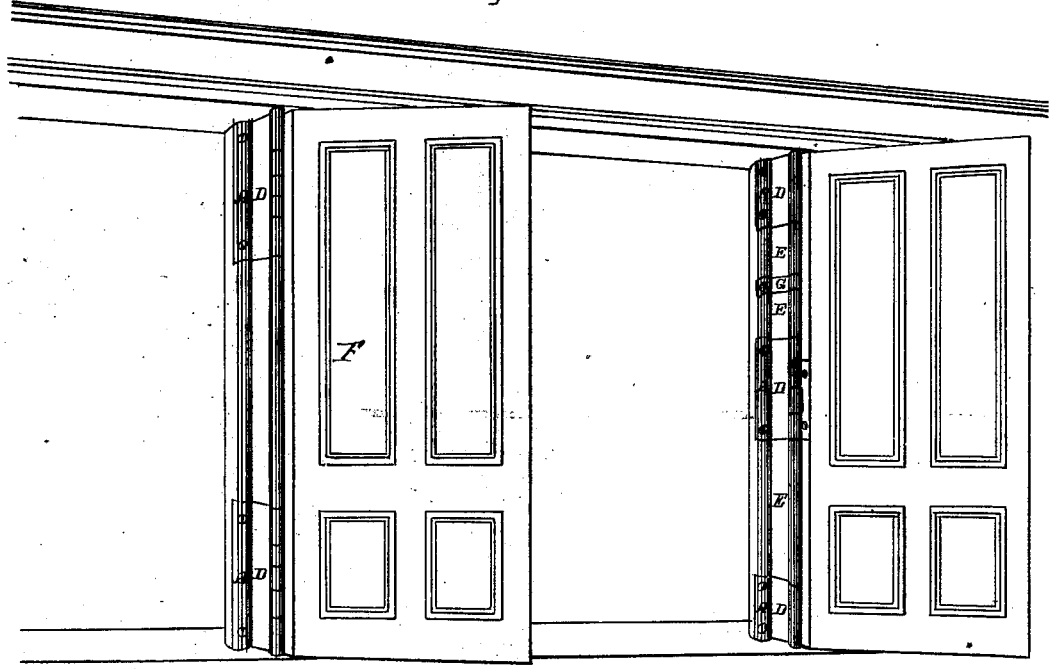
Figure 2:
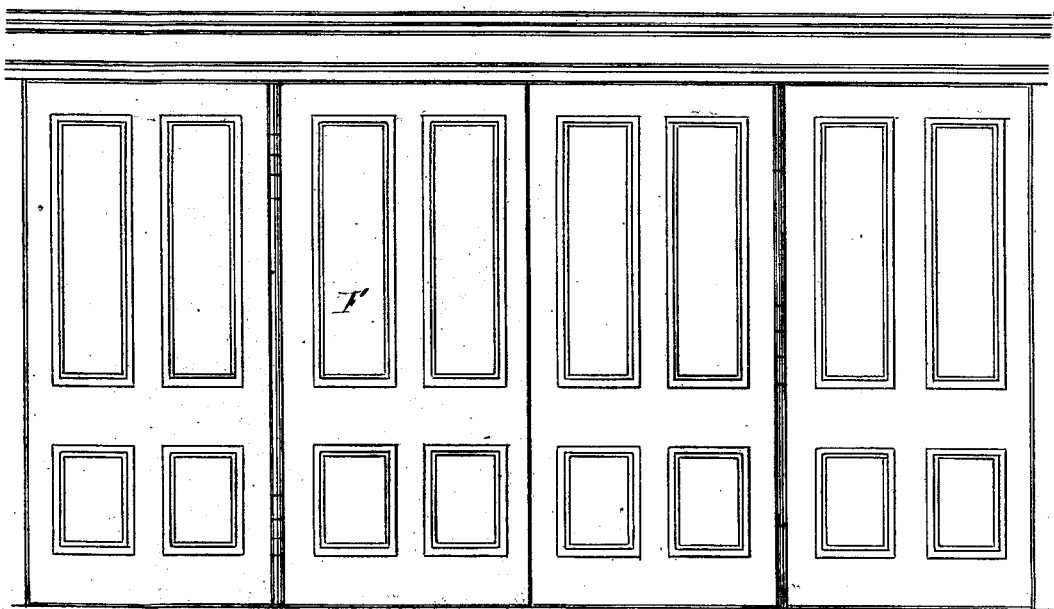
Figure 3:
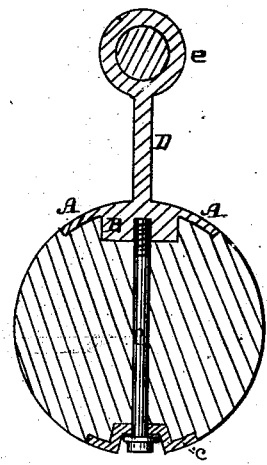
Figure 4:
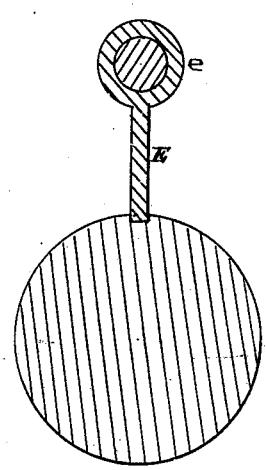
Figure 5:
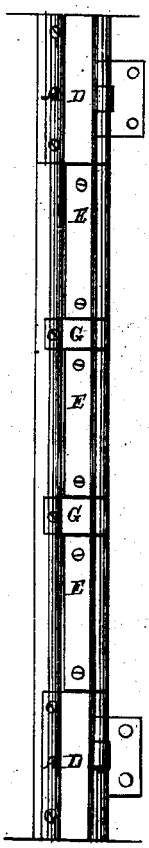
Figure 6:
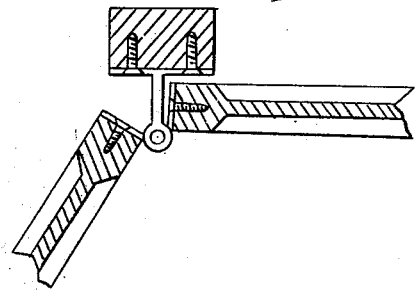
Figure 7:
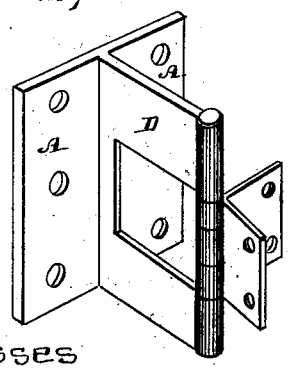
Figure 8:
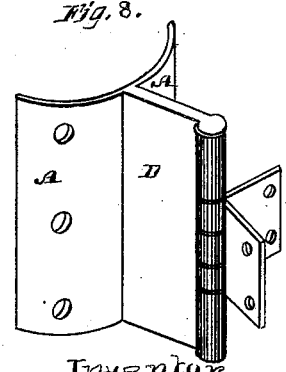
Figure 9:
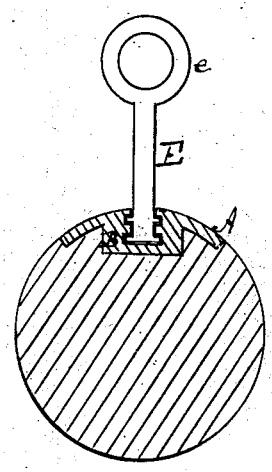
Figure 10:
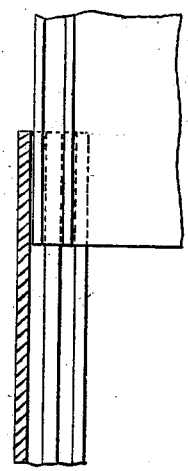
Figure 11:
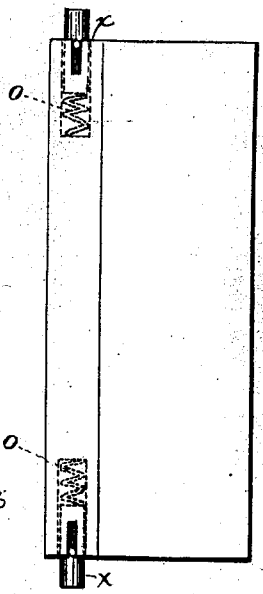

Figure 1 is a perspective view, showing the hinges and intervening sleeves with the plates extending therefrom to the posts. Fig. 2 is a view of the doors closed, showing my hinges and the intervening sleeves. Fig. 3 is a horizontal section of a post, hinge, and plate, showing the manner of securing the hinge to the post. Fig. 4 is a section through the post and the intermediate plate. Fig. 5 shows a method of staying the plate E. Figs. 6 to 11, inclusive, are details.

A is the plate by which the hinge is secured to the post. This plate may be flat or curved to fit any form of post which may be used, and it may be screwed on or bolted to the post, if desired, by having holes through it; but I prefer to secure it as follows: A lug or nut, B, is formed on the inside of the plate, and this lug is adapted to have a bolt screw into it from the inside. The post is countersunk to receive the lug, and the plate A lies flat and flush upon the post, so as to steady and brace the hinge-plate proper, D. A hole is made through the post in line with the nut or lug, and a bolt or screw, C, is introduced and screwed into the lug, so as to draw it and the hinge firmly against the post. When it is desired to release the hinge it may be done by simply turning the bolt around in its place until the nut is released, when the hinge may be removed; but the bolt may remain in its place in the post and leave no unsightly opening. If preferred, the nut B and the plate A may be fixed permanently to the post and the plate D attached to it by means of a dovetailed slot. The plate A would then remain in the post, and no opening would be left when the plate D and hinge are removed, which would in this case be done by slipping the plate D out of the slot. When the post is of wood a metallic socket, c, should be fitted into it opposite the hinge and nut, to receive the head of the bolt and prevent it from wearing the wood. In some cases it may be desirable, when the doors or hinges are to be removed, to take away the plate A and the nut B also. If this is done, a similar plate perfectly plain may be substituted for the plate A, and when secured in place it will leave a perfectly smooth unbroken surface. Another plan would be to employ a separate plate inside the plate A and having a spring behind it, so that when the hinge-plate D is removed or introduced the spring would force the secondary plate out, so as to fill the space left by the removal of the hinge-plate.

In the construction of hinges, as shown in my former patent, openings are left in the body of the hinge, and when used in lofty doors the spaces between the hinges is considerable. It is desirable to have the doors present a symmetrical appearance from top to bottom, both when open and when closed. To accomplish this I use plates E, which extend from the post to the pintle of the door-hinge, or to the line of the pintle, so as to fill the spaces between the plates D of the hinges, and present the appearance of a complete plate from the top to the bottom of the door. When the space between the hinges is long the plates E may have bracing-plates G secured to the post at intervals between them to prevent them from springing.

Cylindrical sleeves e may be formed of a size equal to that of the hinges, and either with or without the plates E. These may be united with the hinges by short pins or projections x at the ends, thus steadying and supporting the plates E. These pins have spiral openings $o$ in their sockets to press them into the holes in the hinges. When the plates E are to be removed the pins are pressed back until they are withdrawn from the hinges. These sleeves are made of the same diameter as the hinges themselves, and as they are in a line with them they present, when the doors F are closed, a continuous bead from top to bottom which is very symmetrical.

When the doors are opened the plates A of the hinges and the supplemental plates E form, in like manner, a continuous close plate from top to bottom, and the whole arrangement presents a much finer appearance, making a close joint the entire length of the door. It will be manifest that the plates E may be used without the sleeves $e$, or that the sleeves may be employed to produce the outside finish without using the plates, without materially altering the character of my invention.

Having thus described my invention, what I claim as new, and desire to secure by Letters Patent, is—

1. The independent doors F and the hinges A D, secured to posts and supporting the doors, as shown, in combination with the intermediate supplemental plates, E, filling the spaces between the hinges and between the edges of the doors and the post, substantially as herein described.

2. The hinges A D, secured to the posts and supporting the independent doors F, as shown, in combination with the sleeves $e$, either with or without the supplemental plates E, standing in line with the hinges, the sleeves forming a continuous bead, substantially as herein described.

3. The plate A of the hinge, having the nut or lug B upon its inner side, in combination with the bolt or screw C, which passes through the post and into the nut, whereby the hinge-plate may be secured to the post, substantially as herein described.

In witness whereof I have hereunto set my hand.

JOSEPH DECOMBE.

Witnesses:
  S. H. NOURSE,
  FRANK A. BROOKS.